UNITED STATES PATENT OFFICE.

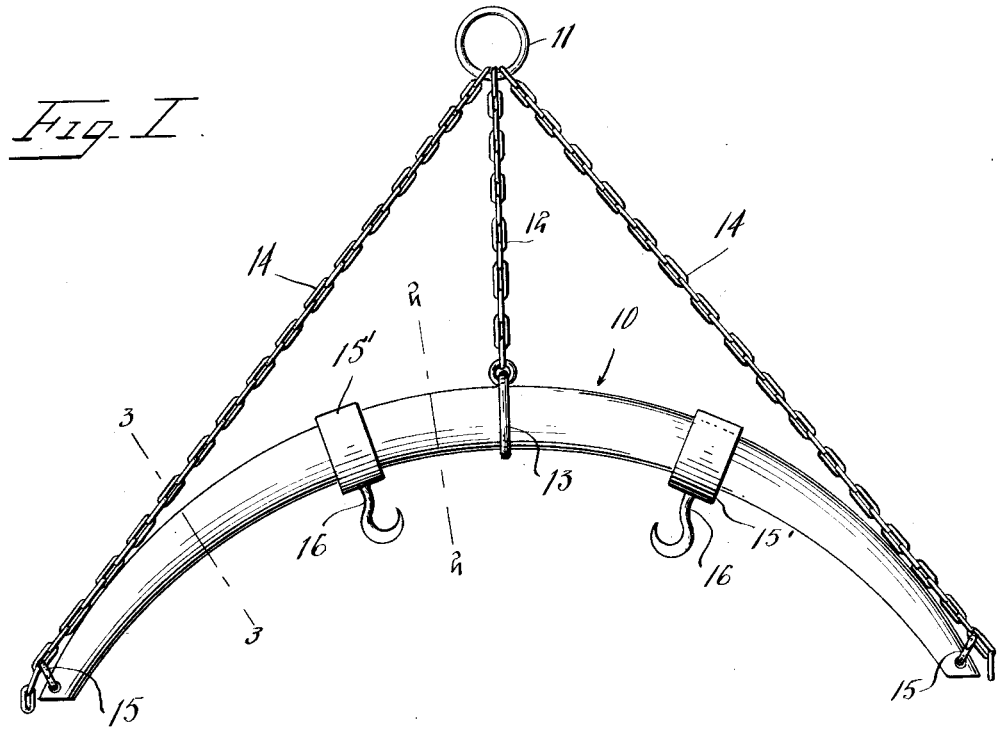
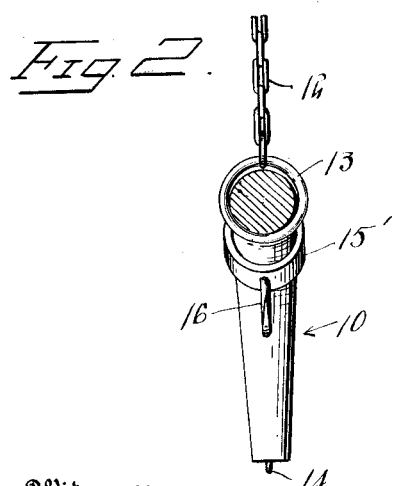
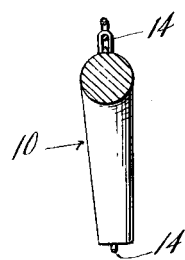

FRANKLIN H. PIERCE, OF PRINCETON, ILLINOIS.

GAMBREL.

1,029,314.

Specification of Letters Patent. Patented June 11, 1912.

Application filed November 6, 1911. Serial No. 658,825.

*To all whom it may concern:*

Be it known that I, FRANKLIN H. PIERCE, a citizen of the United States, residing at Princeton, in the county of Bureau, State of Illinois, have invented certain new and useful Improvements in Gambrels; and I do hereby declare the following to be a full, clear, and exact description of the invention, such as will enable others skilled in the art to which it appertains to make and use the same.

My invention relates to new and useful improvements in gambrels, and the object of my invention is to improve the construction and increase the efficiency of the same.

A still further object of my invention is to construct a gambrel in which the weight of the suspended animal will operate to spread the same.

With these and other objects in view my invention will be more fully described, illustrated in the drawings which show a preferred embodiment of my device and then specifically pointed out in the claims which are attached to and form a part of this invention.

In the drawings, Figure 1 is a side elevation of my improved gambrel. Fig. 2 is a section on the line 2—2 of Fig. 1. Fig. 3 is a similar section on the line 3—3 of Fig. 1.

Referring more specifically to the drawings, in which similar reference numerals designate corresponding parts throughout, 10 designates the body proper of the gambrel which as shown, is arcuate in shape and circular in section and tapers from the center toward both ends. As a means for suspending this body member I provide a ring 11 which is connected by a chain 12 with a ring 13 which surrounds the central portion of the body member, and by chains 14 which connect with rings 15 carried by the ends of the body member, said chains being so proportioned that when the device is suspended by the ring 11 the bow of the body member will be directed upwardly and the strain will be equally divided between the chains as best shown in Fig. 1.

Sleeves 15' are positioned around the body member one upon each side of the center and these sleeves are so formed as to be slidable upon the body member and are each provided with a downwardly depending swiveled hook 16 adapted for engagement with the tendons of the hind legs of the carcass.

In operation the sleeves 15' are brought together at the center of the body member 10, the dead animal is lifted and engaged upon the hooks in the customary manner. The carcass is then released and as will be readily seen the weight of the carcass will cause the sleeves to move away from each other, said sleeves sliding down toward the ends of the body member and thus effectively spreading the carcass.

From the foregoing description it will be apparent that I have provided an extremely simple gambrel and one which is adapted to automatically spread any carcass suspended upon it.

What I claim is:—

1. A gambrel, comprising an arcuate shaped body member tapered from its center toward both ends, a pair of hook bearing sleeves slidable upon said body member and means for suspending said body member with its bowed portion directed upwardly.

2. A gambrel, comprising an arcuate shaped body member tapered from its center toward both ends, a pair of hook bearing sleeves slidable upon said body member, a suspending ring, a chain connecting said ring with the center of the body member, and chains connecting said ring with the ends of the body member, said latter chains being so proportioned that when the gambrel is suspended the bowed portion of the body member will be directed upwardly.

In testimony whereof, I affix my signature, in presence of two witnesses.

FRANKLIN H. PIERCE.

Witnesses:
D. M. PHILLIPS,
FRANK GRAMPP.

Copies of this patent may be obtained for five cents each, by addressing the "Commissioner of Patents, Washington, D. C."